(12) United States Patent
Asai et al.

(10) Patent No.: US 6,328,141 B1
(45) Date of Patent: Dec. 11, 2001

(54) DRUM BRAKE DEVICE WITH AUTOMATIC SHOE CLEARANCE ADJUSTMENT DEVICE

(75) Inventors: Seiji Asai, Okazaki; Yoshihiro Tatsumi, Aichi-ken, both of (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/691,118

(22) Filed: Oct. 19, 2000

(30) Foreign Application Priority Data

Oct. 21, 1999 (JP) ................................................. 11-299436

(51) Int. Cl.[7] ..................................................... F16D 65/56
(52) U.S. Cl. ..................................... 188/79.52; 188/79.54; 188/196 BA
(58) Field of Search ........................... 188/79.51, 79.52, 188/196 BA, 79.54, 79.55, 79.56, 79.62, 79.63, 79.64, 196 R, 106 F, 325, 327, 328

(56) References Cited

U.S. PATENT DOCUMENTS

| | | | |
|---|---|---|---|
| 4,148,380 | * 4/1979 | Haraikawa | 188/79.52 |
| 4,558,766 | * 12/1985 | Palmer et al. | 188/79.52 |
| 5,246,090 | * 9/1993 | Quere et al. | 188/79.52 |
| 6,196,360 | * 3/2001 | Iizuka et al. | 188/79.52 |

* cited by examiner

*Primary Examiner*—Douglas C. Butler
(74) *Attorney, Agent, or Firm*—Liniak, Berenato, Longacre & White

(57) ABSTRACT

A adjustment lever (80) has dual-functions characterized in that when an actuating force to a brake shoe (20) to move outward reaches predetermined magnitude, a device (80g) prevents over-adjustment of shoe-to-drum clearances disables a device (70) to restrict return positions of brake shoes inhibiting the brake shoes movement in the direction to separate each other and when a brake temperature rises certain degree, a device (80d) to prevent over-adjustment of brake shoe-to-drum clearances disables the device (70) to restrict return position inhibiting the brake shoe movement as well. The inventive design secures the function of over-adjustment prevention of the shoe-to-drum clearances and to downsize and to lighten a drum brake device without sacrificing its operation

12 Claims, 15 Drawing Sheets

DRUM BRAKE DEVICE WITH AUTOMATIC SHOE CLEARANCE ADJUSTMENT DEVICE

BACKGROUND OF INVENTION

1. Field of the Invention

This invention relates to a drum brake device with an automatic shoe clearance adjustment device for a motor vehicle and, more specifically, to a means to prevent over-adjustment operation of the automatic shoe clearance adjustment device.

2. Description of Related Art

Conventional means to prevent over-adjustment of shoe-to-drum clearances with the automatic shoe clearance adjustment device may broadly be known in the following two types of different means.

For example, as a first type, the Japanese Patent Application Publication Numbers 57-8975 and 2-15737 disclose one means disabling automatic adjustment operation of shoe-to-drum clearances by inhibiting a rotation of an adjustment lever, when an actuating force to separate brake shoes apart, reaches a predetermined magnitude.

As a second type, the U.S. Pat. Nos. 4,385,681, 4,390,086, and German Patent Application Unexamined Publication Number 3100678 disclose another means disabling automatic adjustment operation of the shoe-to-drum clearances by thermally deforming a bimetallic piece when a brake temperature rises up to the certain degree.

However, both conventional means have various problems as stated below when the respective means is used independently.

Recently, in terms of an effective use of a rear braking force, automobile industries tend to increase the number of motor vehicles with the Electronic Brakeforce Distribution (EBD) system which is intended to provide the most effective braking force distribution in relation to the front and rear braking forces. A vehicle with the EBD system is characterized in that the rear braking force is adapted to be stronger (higher) than that of a conventional vehicle equipped with a hydraulic pressure control valve, i.e., a pressure proportioning valve, a deceleration responsive valve, and a load sensitive proportioning valve.

Due to the fact that the higher load is placed on the rear brake of the vehicle with the EBD system than that of the vehicle without the EBD system, higher thermal energy is generated during the braking operation.

To achieve the required shoe-to-drum clearances under high load and temperature, the shoe-to-drum clearances must be a bit larger than an ideal value during the normal use if one of the above-two means to prevent over-adjustment is employed independently. As a result, if the shoe-to-drum clearances become smaller than the setting, it is less likely to cause a problem of dragging. Although it is possible to prevent the over-adjustment of the shoe-to-drum clearances by designing the shoe-to-drum clearances to be larger during the normal use, it automatically leads to a longer pedal stroke giving an uncomfortable feeling to the driver.

As a general strategy to deal with the above-problems in relation to the high load and high temperature condition, it is known that a diameter of the brake drum may be designed to be larger, which also enlarges the size of drum brake itself. While an enlarged brake may resolve the above-problems, the enlarged brake generally causes other problems of providing a heavier device, an environmentally problematic device, and a high energy consuming device. These problems lead to the need for making an improvement without enlarging the size of the brake.

OBJECT AND SUMMARY OF THE INVENTION

This invention is made to improve upon the above drawbacks noted in the prior art, and an object of this invention is to provide a drum brake device with an automatic shoe clearance adjustment device realizing the long-lasting assurance in the appropriate operation of preventing over-adjustment of the shoe-to-drum clearances even under the high load and temperature condition. Further an object of this invention is to provide a drum brake device with an automatic shoe clearance adjustment device minimizing its size and improving the feeling of the braking action without sacrificing the optimum shoe-to-drum clearances.

To the above-ends, this invention is a drum brake device with an automatic shoe clearance adjustment device, which extends between a pair of adjacent ends of facing brake shoes. The device comprises a restricting means for restricting return positions of the brake shoes and for displacing automatically the brake shoes in a separation direction to separate each brake shoe when the shoe-to-drum clearances exceed predetermined value. The automatic shoe clearance adjustment device further has a preventing means to prevent an over-adjustment of the shoe-to-drum clearances by inhibiting displacement of the brake shoes in the separation direction to separate each brake shoe due to the restricting means when at least one of an actuating force to separate the pair of brake shoes reaches the predetermined magnitude or a temperature in the drum brake rises up to the certain degree.

This invention further provides a drum brake device with an automatic shoe clearance adjustment device, wherein the restricting means comprises a screw mechanism and adjustment teeth, and when the amount of rotational movement of an adjustment lever which automatically senses an excessive brake shoes separation exceeds one tooth pitch of the adjustment teeth, the adjustment lever urges the adjustment teeth into rotation resulting in length extension of the screw mechanism and displacement of the brake shoes in the separation direction to separate each brake shoe.

This invention still further provides a drum brake device with an automatic shoe clearance adjustment device, wherein the adjustment lever is pivotally supported on one brake shoe for the rotation relative to the one brake shoe. The adjustment lever has two legs, and due to an urging force of an adjustment spring, a first leg extending from a pivot section of the adjustment lever is urged to be elastically engaged with one end of the restricting means while a second leg also, but oppositely extending from the pivot section of the adjustment lever is urged to be ratchet-engaged with the adjustment teeth.

This invention still further provides a drum brake device with an automatic shoe clearance adjustment device, wherein the adjustment lever is pivotally supported on one brake shoe for rotation relative to one brake shoe. The adjustment lever has two legs, and due to urging force of an adjustment spring, a first leg extending from a pivot section of the adjustment lever is urged to be elastically engaged with one end of an engagement piece integrally acts with a piston, a device to displace the brake shoes, while second leg also but oppositely extending from the pivot section of the adjustment lever is urged to be ratchet-engaged with the adjustment teeth.

This invention still further provides a drum brake device with an automatic shoe clearance adjustment device, wherein the adjustment lever is integrally provided with a force sensing section responsive to a brake shoe action and a bimetallic thermal sensing section responsive to a temperature within a drum brake. The force sensing section and the bimetallic thermal sensing section function as a means to prevent over-adjustment operation of shoe-to-drum clearances.

This invention still further provides a drum brake device with an automatic shoe clearance adjustment device wherein a force sensing section responsive to brake shoe action is extended from a pivot section of the adjustment lever and is positioned so as to be rotatable in the crossing direction of an axial line of a brake shoe actuating device. When a force acting on the force sensing section from the actuating device becomes stronger than an urging force of the adjustment spring effecting thereon, the adjustment lever is restricted to rotate by sandwiching the force sensing section between the actuating device and the brake shoe.

This invention still further provides a drum brake device with an automatic shoe clearance adjustment device, wherein, when an axial force acting on the screw mechanism of the restricting means becomes higher than an urging force of the adjustment spring acting on a pawl end of the adjustment lever, a rotation resistance of the screw mechanism increases to inhibit rotation of the adjustment lever.

This invention still further provides a drum brake device with an automatic shoe clearance adjustment device, wherein a bimetallic piece is installed on the second leg of the adjustment lever, and when a brake temperature reaches a certain degree, a pawl end formed at the end of the second leg thermally deformed apart from the adjustment teeth to release the ratchet engagement between the second leg and the adjustment teeth.

This invention still further provides a drum brake device with an automatic shoe clearance adjustment device, wherein the restricting means comprises a teeth engagement mechanism allowing a rotation of the adjustment lever in one direction, and a strut, and as the strut which automatically senses excess brake shoe movement rotates the adjustment lever, a position of teeth engagement among the small teeth at the adjustment lever moves to rotate brake shoes to spread apart.

This invention still further provides a drum brake device with an automatic shoe clearance adjustment device, wherein a force sensing section responsive to brake shoe action and a bimetallic thermal sensing section responsive to brake temperature are substantially integrated with the adjustment lever, and the force sensing section and the bimetallic thermal sensing section function as a means to prevent over-adjustment operation of shoe-to-drum clearances.

This invention still further provides a drum brake device with an automatic shoe clearance adjustment device, wherein a force sensing section responsive to brake shoe action is extended from a pivot section of the adjustment lever and is positioned so as to be rotatable in the crossing direction of an axial line of a brake shoe actuating device. When a force acting on the force sensing section from the actuating device becomes stronger than an urging force of the adjustment spring effecting thereon, the adjustment lever is restricted to rotate by sandwiching the force sensing section between the actuating device and the brake shoe.

This invention further provides a drum brake device with an automatic shoe clearance adjustment device, wherein an adjustment lever and a top end of the bimetallic piece abutting against the back of the adjustment lever are inserted between a space at one side of the strut, forming a space at the side toward which the brake shoes spread open when a brake temperature reaches a certain degree. The bimetallic piece thermally deforms for the top end thereof coming out from the space in the direction to expand the space.

BRIEF DESCRIPTION OF THE DRAWINGS

The above and other objects of the present invention will become readily apparent by reference to the following detailed description when considered in conjunction with the accompanying drawings wherein.

DETAILED DESCRIPTION OF THE PREFERRED EMBODIMENTS

Figure 2:
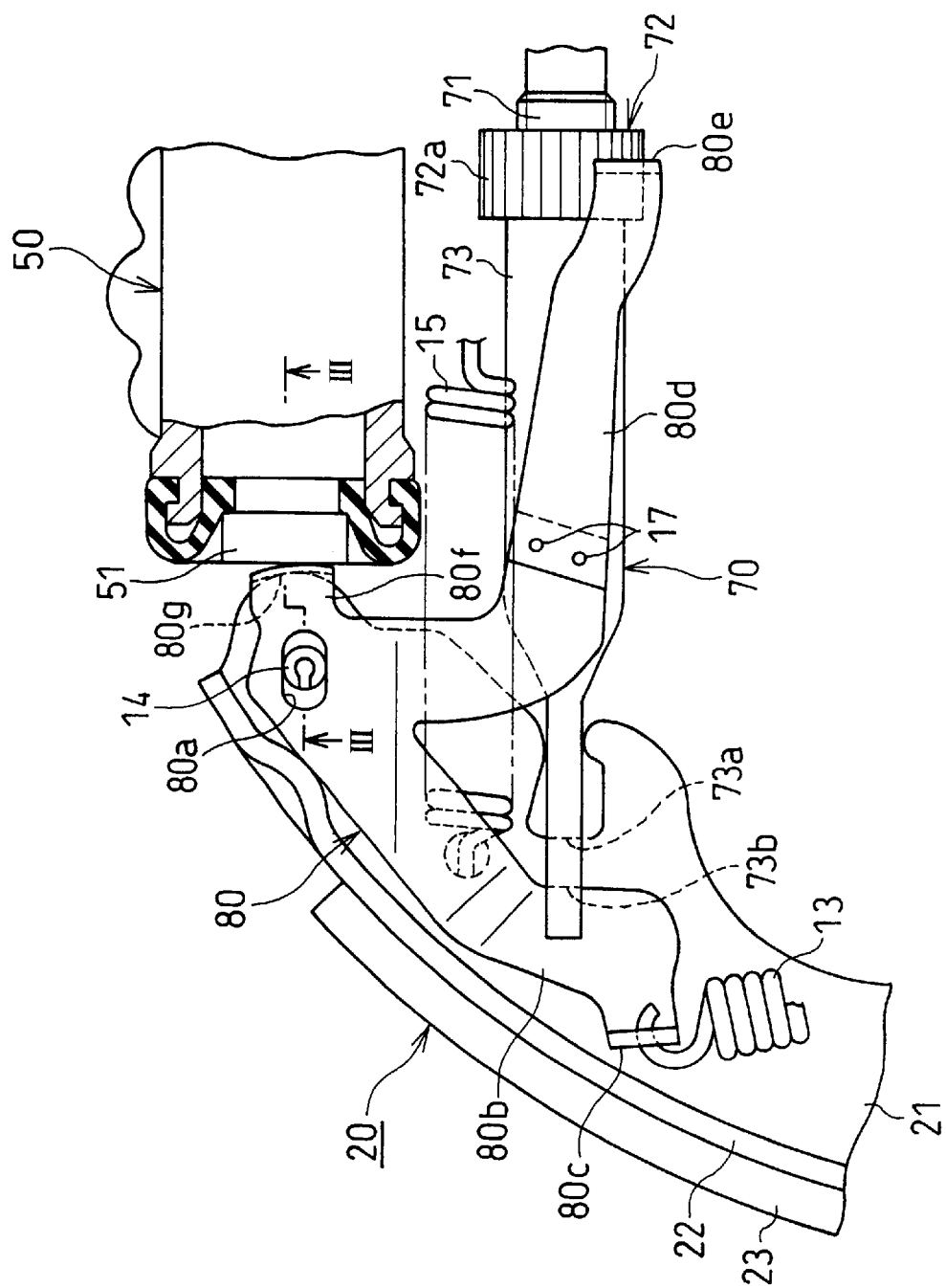
FIG. 2 is an enlarged view of the means to prevent over-adjustment operation of shoe-to-drum clearances shown in FIG. 1.
Figure 3:
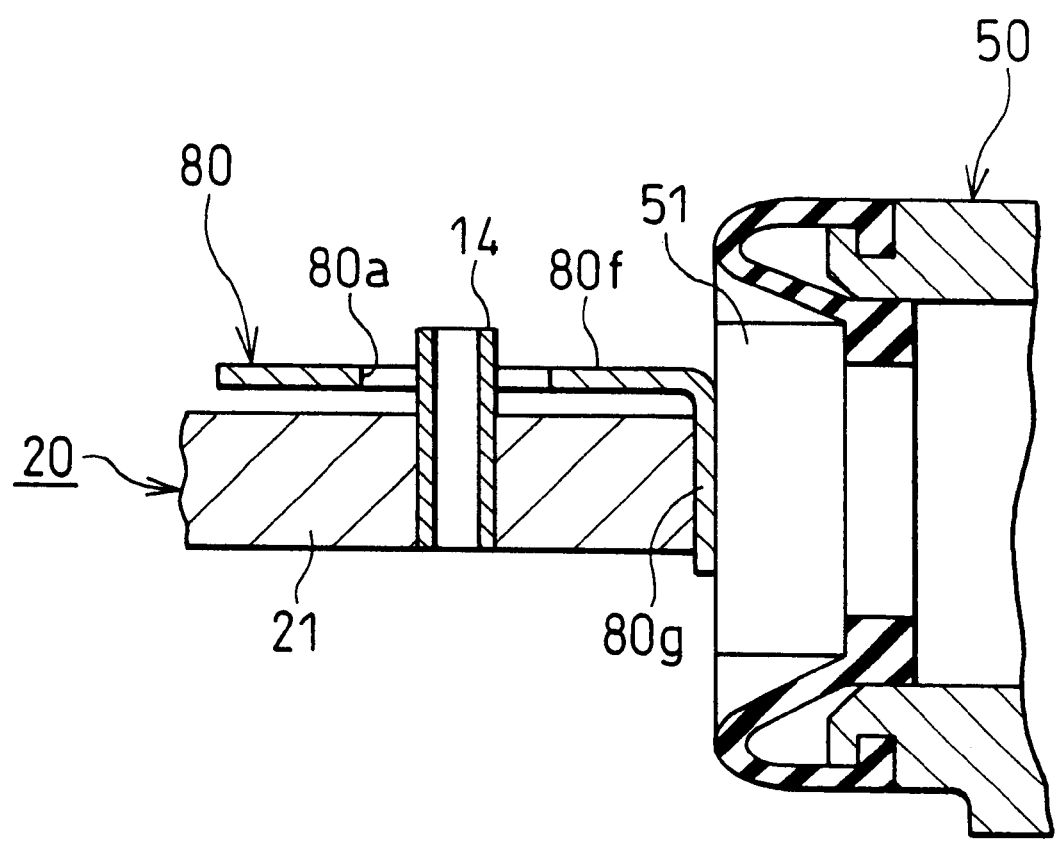
FIG. 3 is a cross-section view of FIG. 2 taken along the line III—III.

The first embodiment of this invention is explained with reference to FIGS. 1–3.

Figure 1:
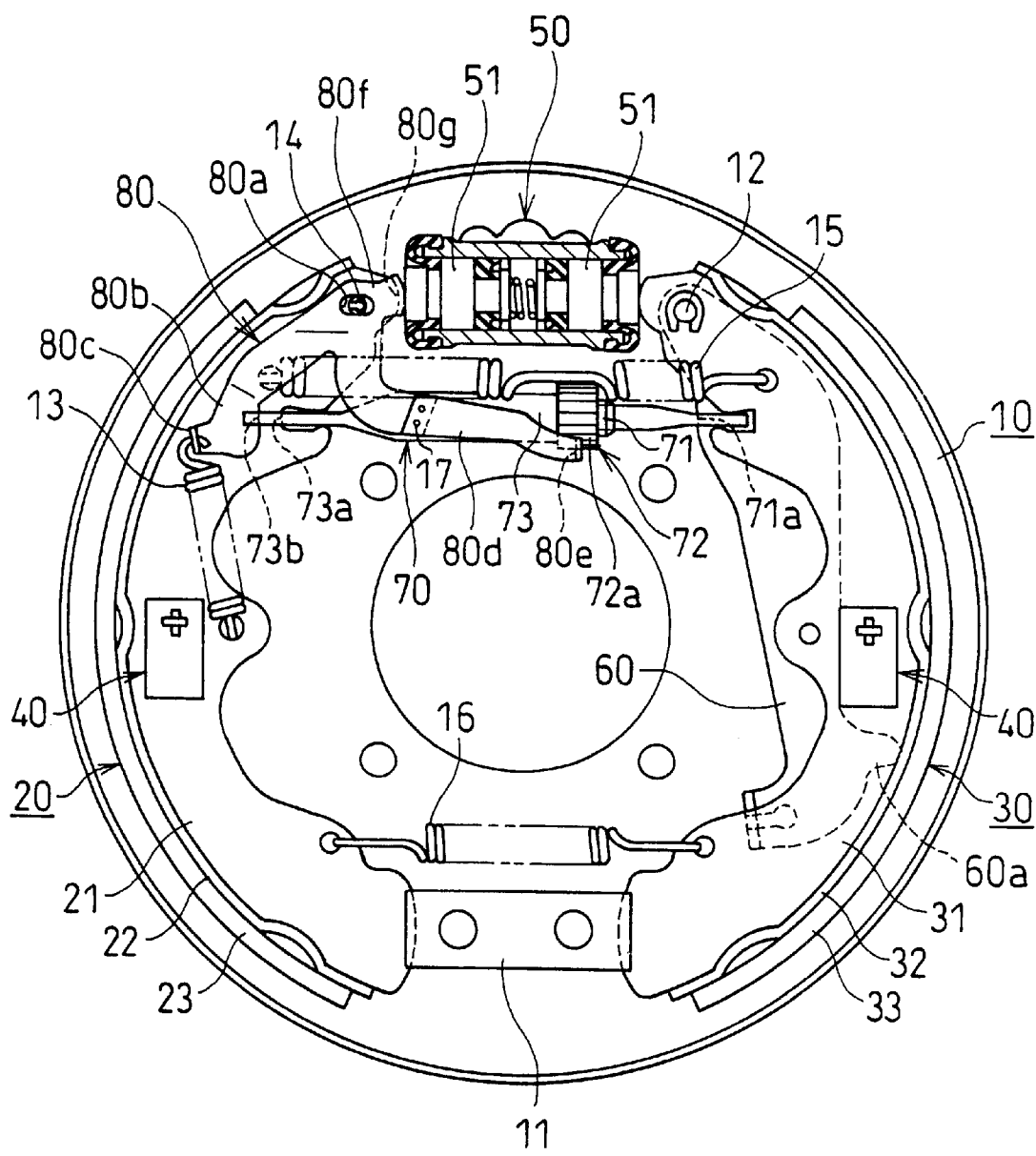
FIG. 1 is the plan view of leading-trailing type drum brake device with the automatic shoe clearance adjustment device relating to a first embodiment of this invention.

FIG. 1 shows an example of a leading-trailing (LT hereinafter) type drum brake device with an automatic shoe clearances adjustment device. The reference number 10 is a back plate adapted to be fixed on a stationary part of a motor vehicle with bolts, and a pair of brake shoes 20, 30 are slidably supported on the back plate 10 by conventional shoe hold devices 40, 40.

The pair of brake shoes 20, 30, each being T-shaped in cross-section, are assembled by jointing shoe rims 22, 32 with shoe webs 21, 31 and placing linings 23, 33 fixed on peripheral surfaces of shoe rims 22, 32.

Regarding the brake shoes 20, 30, each has its one end engaging with a piston 51 of a wheel cylinder 50 functioning as a service brake actuator, i.e., a device to separate the brake shoe 20 or 30 apart, and the other end (at the lower side in FIG. 1) being supported by an anchor 11 fixed on the back plate 10.

Shoe return springs 15,16 are extended between the shoe webs 21, 31 of the brake shoes 20, 30. The forward-pull type brake lever 60 for a parking brake is superposed on the shoe web 31 of the brake shoe 30 and has its one end pivotally supported by a pin 12.

Here, an explanation of a parking brake structure and operation will be omitted since a parking brake has no effect on automatic shoe clearance adjustment operation.

An automatic shoe clearance adjustment device mainly comprises a strut 70 restricting return positions of the pair of brake shoes 20, 30, an adjustment lever 80, and an adjustment spring 13.

The strut 70 is a screw-thread mechanism and comprises an adjustment bolt 71, an adjustment nut 72, and a socket 73, which extends between the brake shoe 20 and the brake lever 60. During no braking action, the brake lever 60 abuts an inner surface of the shoe rim 32 by a stopper 60a at the back thereof while when the brake is in operation the brake lever 60 moves together with the brake shoe 30. Accordingly, the strut 70 has the same function as the case when it is extended between the pair of brake shoes 20 and 30.

The bolt 71 has an external thread formed at the shaft section on left side of the bolt 71 and the nut 72 has plural adjustment teeth 72a formed on the peripheral surface of the nut 72 which screws on the bolt 71. The remaining threaded shaft section of the bolt 71 at its left side (not shown in Figure) is rotationally interfit in a hollow section of the socket 73. A notched groove 71a formed on right end of the bolt 71 engages with the brake lever 60; therefore, the bolt 71 does not rotate.

An opening end of the hollow section at the right side of the socket 73 abuts the side face of the nut 72, and a notched groove 73a formed on the left end of the socket 73 engages with the shoe web 21 of the brake shoe 20; therefore, the socket 73 does not rotate. The bolt 71 is projected out from the socket 73 by rotating the nut 72, thereby allowing adjustment of the entire length of the strut 70.

The adjustment lever 80 is an approximately L-shaped long plate having an oblong hole 80a formed on a top end of the adjustment lever 80. A pin 14 raised at or projecting from the upper portion of the brake shoe 20 is inserted in the oblong hole 80a to rotate relative to the brake shoe 20 and supports the adjustment lever 80, allowing the lever 80 to slide in axial direction of the wheel cylinder 50.

The adjustment lever 80 is integrally formed with a first leg 80b, a second leg 80d, and a third leg 80f.

The first leg 80b is extended from a pivot section of the adjustment lever 80 in the circumferential direction of the brake shoe 20, and its plated top end is bent in almost a right angle toward the direction to depart from the shoe web 21, ultimately forming a hooking portion 80c.

The adjustment spring 13 extended between the hooking portion 80c and the brake shoe 20 urges the adjustment lever 80 counterclockwise with respect to the pin 14.

In addition, an inner edge of the first leg 80b elastically contacts with a stepped portion 73b in the notched groove 73a of the socket 73 to restrict the counterclockwise rotation of the adjustment lever 80. The strut 70 also functions as a means to maintain the predetermined position of the adjustment lever 80.

The second leg 80d of adjustment lever 80 is extended from the pivot section of the adjustment lever 80 toward the nut 72, and its top end is bent in [the] a right angle to form a pawl portion 80e. A biasing force generated by the adjustment spring 13 constantly urges the pawl portion 80e to the adjustment teeth 72a in the direction that the pawl portion 80e abuts and engages with the adjustment teeth 72a.

The third leg 80f is integrally extended from the pivot section of the adjustment lever 80 toward the piston 51, and its top end is bent in a right angle in the direction to the shoe web 21 to form an intercalated portion 80g. The intercalated portion 80g is positioned between the piston 51 and an end of the shoe web 21, thereby constituting a later described force-sensing section.

Abutting surfaces of the intercalated portion 80g of the adjustment lever 80 and the top end of the shoe web 21 are preferably semi-circular in shape. A radius of curvature of both abutting surfaces are designed so that the center of curvature of the semi-circular surface at the shoe web 21 is preferably the center of the pin 14 and the radius of curvature of intercalated portion 80g at the adjustment lever 80 becomes a bit larger than that of the shoe web 21. This is to realize a smooth rotation of the adjustment lever 80.

The adjustment lever 80 is pivoted by the pin 14 raised on the brake shoe 20 to rotate relative to the brake shoe 20 and to shift relative to the brake shoe 20 towards the axial direction of the wheel cylinder 50. This pivot structure is designed to maintain a constant abutment between the end surfaces of the shoe web 21 and the intercalated portion 80g of the adjustment lever 80 with no gap in order to be free from any effect of the manufacturing tolerances.

In addition, the pivot structure of the adjustment lever 80 is not limited to the above-description, and the pin 14 may be provided on the adjustment lever 80 while the oblong hole may be provided on the shoe web 21.

The adjustment lever 80 comprises two kinds of means to prevent over-adjustment operation of shoe-to-drum clearances. One means to prevent over-adjustment operation of shoe-to-drum clearances is a means to disable automatic adjustment operation of the shoe-to-drum clearances when the actuating force to separate the pair of brake shoes 20, 30 apart, reaches the predetermined magnitude. Another means to prevent over-adjustment operation of shoe-to-drum clearances is a means to disable automatic adjustment operation of the shoe-to-drum clearances when the brake temperature rises up to the certain degree.

One means to prevent over-adjustment operation of shoe-to-drum clearances comprises the intercalated portion 80g of the third leg 80f positioned between the end of the shoe web 21 and the piston 51 of the wheel cylinder 50, which functions as a force sensing section responsive to the action of the brake shoe 20.

Another means to prevent over-adjustment operation of shoe-to-drum clearances comprises a bimetallic second leg 80d functioning as a temperature sensor in which the second leg 80d senses the temperature inside of the drum brake.

Only second leg 80d is a bimetallic member among the components of the adjustment lever 80, which may be combined with other steel members by such as rivet 17 or other suitable fastening means known to those of skill in the art. Alternatively, entire adjustment lever 80 may be a bimetallic member or a bimetallic material may be employed in a midway of the second leg 80d. At least, the second leg 80d is thermally deformed when the brake temperature rises up to the certain degree, and the bimetallic portion is practically integrated with the adjustment lever 80 so that the pawl portion 80e at its top end moves toward the direction apart from the adjustment teeth 72a of the nut 72.

In FIG. 1, upon pressurizing the wheel cylinder 50 by activating the service brake, the brake shoes 20, 30 rotate with pivot points between the brake shoes 20, 30 and the anchor 11 until they come into contact with a brake drum, not shown in FIG. 1. As the adjustment lever 80 rotates counterclockwise with the pin 14 by the spring force of the adjustment spring 13, the strut 70 and the brake lever 60 are to follow the movement of the brake shoe 30.

If linings 23, 33 wear out, the amount of movement of both brake shoes 20, 30 increases, and the amount of rotation of the pawl portion 80e of the adjustment lever 80 exceeds one tooth pitch of the adjustment teeth 72a, the pawl portion 80e rotates the nut 72 to project the bolt 71 out from the socket 73. As a result, the entire length of the strut 70 extends for suitable amount of one tooth pitch of the adjustment teeth 72a, and the shoe-to-drum clearances are maintained constant by automatically adjusting the shoe-to-drum clearances.

While in the above-described automatic shoe clearance adjustment operation, if the force to separate the brake shoe 20 away reaches the predetermined magnitude, the intercalated portion 80g of the adjustment lever 80 becomes caught between the piston 51 and the shoe web 21, thereby restricting the rotation of the adjustment lever 80 with the pin 14. As a result, automatic shoe clearance adjustment operation inhibits, which prevents an over-adjustment operation of the shoe-to-drum clearances thereafter.

More specifically, after receiving the force stronger than the actuating force of the adjustment spring 13, although the adjustment lever 80 only moves together with the brake shoe 20, even if a pressure applied to the wheel cylinder 50 is increased, the automatic shoe clearance adjustment device does not sense thereafter any elastic deformation of the brake shoes 20, 30 and the brake drum.

During the automatic shoe clearance adjustment operation, as the brake temperature increases and reaches the certain degree, the bimetallic second leg 80d of the adjustment lever 80 becomes thermally deformed in the direction away from the adjustment teeth 72a, thereby disabling the ratchet engagement between the pawl portion 80e and the adjustment teeth 72a of the nut 72. As a result, automatic shoe clearance adjustment operation inhibits, which prevents an over-adjustment operation of the shoe-to-drum clearances thereafter.

More specifically, as the amount of the thermal defamation occurred in the bimetallic second leg 80d of the adjustment lever 80 increases, the pawl portion 80e move away from the adjustment teeth 72a, thereby incapacitating the strut 70 for its extension function, and automatic shoe clearance adjustment device does not sense any expansion of the brake drum until the temperature decreases certain degree.

As stated above, the adjustment lever 80 has two kinds of means to prevent over-adjustment operation of shoe-to-drum clearances under excessive application force and high temperature condition. Therefore, the clearances between the linings 23, 23 and the brake drum may be set small and the diameter of the drum brake may be designed smaller.

The second embodiment provides another means to prevent over-adjustment operation suitable for a drum brake device with an actuating force sensing means (e.g., shown in Japanese Patent Application Publication Number 57-8975).

This embodiment is explained with reference to FIGS. 4–7. Reference number of the components of this embodiment are identified with a 100-series of numbers, and the components which are the same function as in the first embodiment are identified with first and second position of reference number to be same as the first embodiment, e. g. reference number "10" and "110" are the same function. In such a case, a detailed explanation is omitted hereafter.

Figure 4:
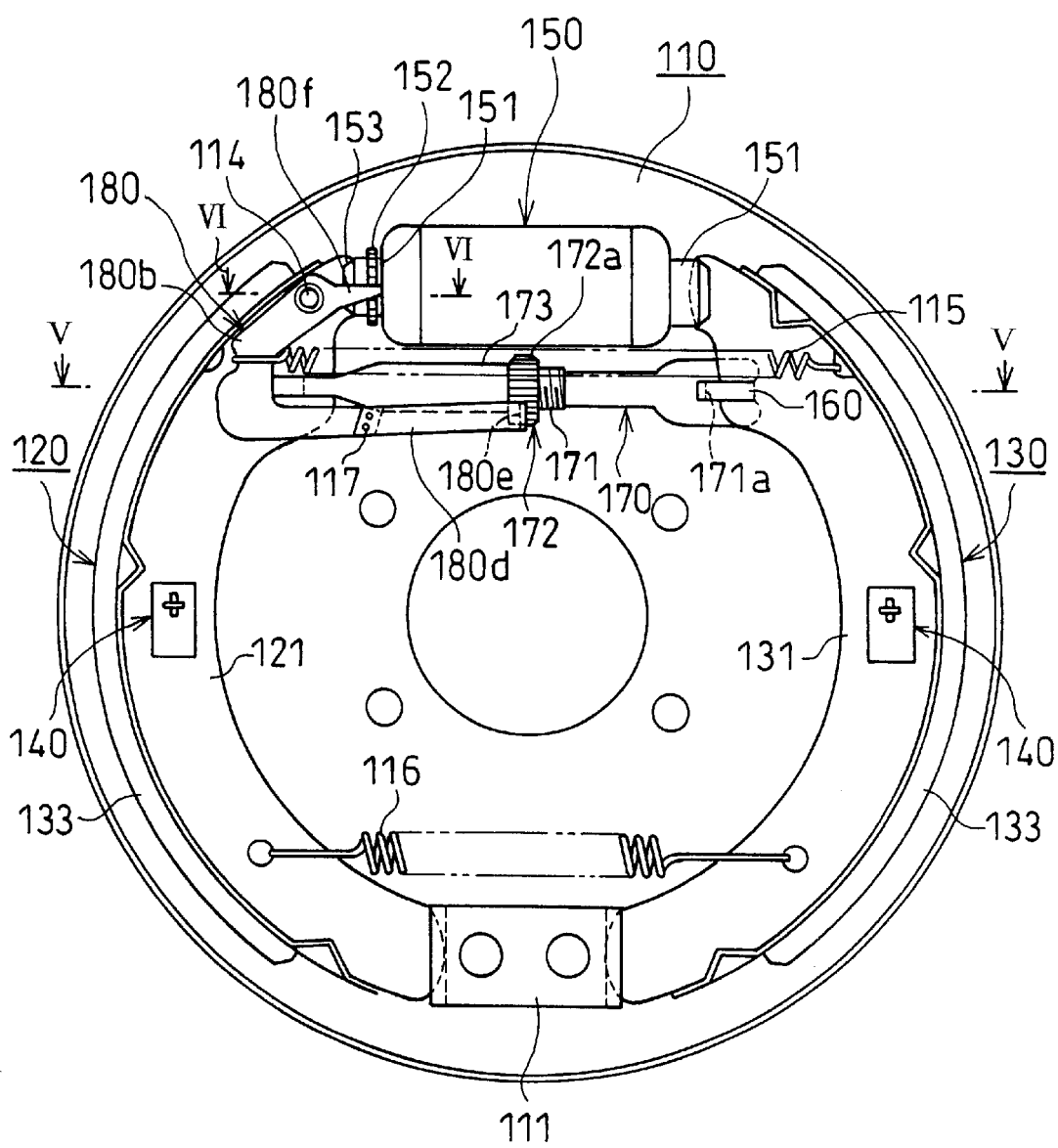
FIG. 4 is a plan view of the drum brake device relating to the different type of pressure sensitive means relating to a second embodiment of this invention.

FIG. 4 shows a LT type drum brake device, wherein an incremental adjustment type strut 170 is extended between upper ends of a pair of brake shoes 120, 130 just as the first embodiment and comprises a bolt 171, a nut 172, and a socket 173.

An almost L-shaped plate adjustment lever 180 is pivotally supported by a pin 114 at the upper side of one brake shoe 120 and is relatively rotatable with respect to the brake shoe 120. An inner side of a first leg 180b extending from this pivot section abuts the left end surface of the socket 173, and a pawl portion 180e at the end of a second leg 180d extending from the first leg 180b makes a ratchet engagement with adjustment teeth 172a of the nut 172. Further, a top of a third leg 180f extending from the pivot section engages a peripheral teeth 152a of a wheel 152.

Figure 6:
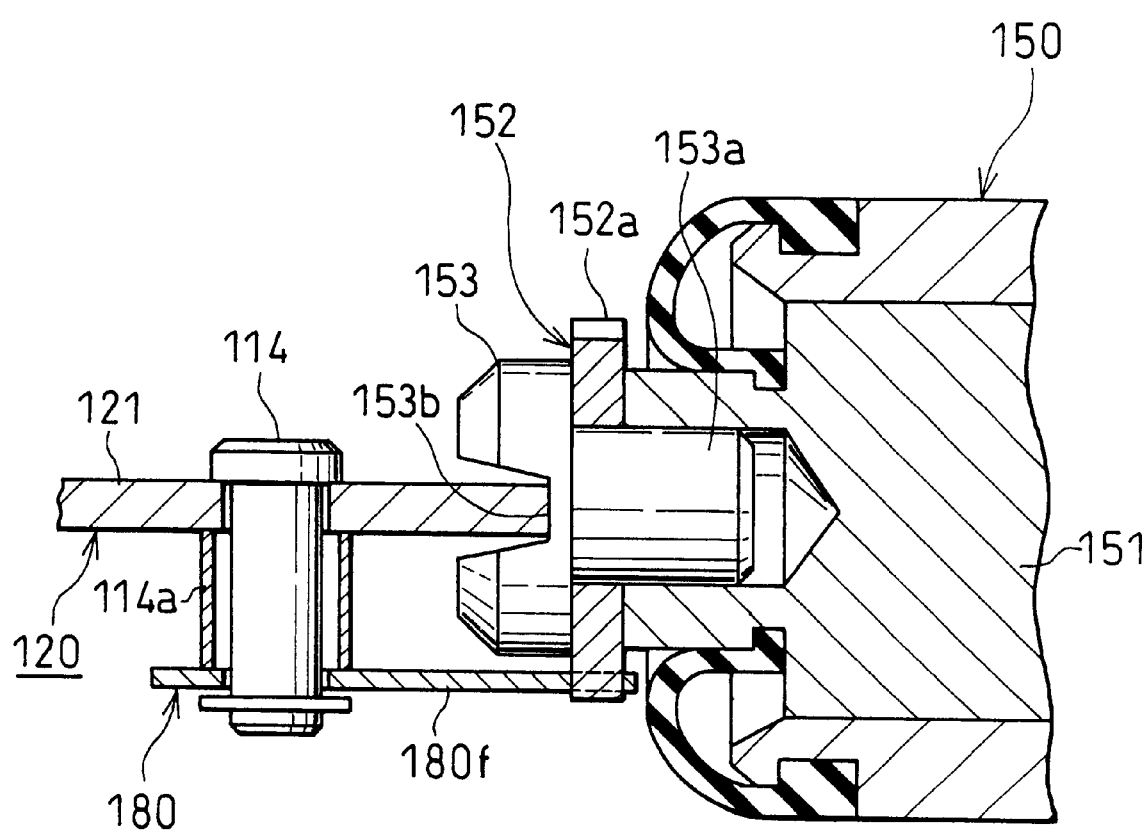
FIG. 6 is a cross-section view of FIG. 4 taken along the line VI—VI.

In addition, an upper shoe return spring 115 extending between the adjustment lever 180 and a brake shoe 130 also functions as an adjustment spring. A tube spacer 114a is covering a pin 114 between a shoe web 121 and the adjustment lever 180 as shown in FIG. 6.

Figure 5:
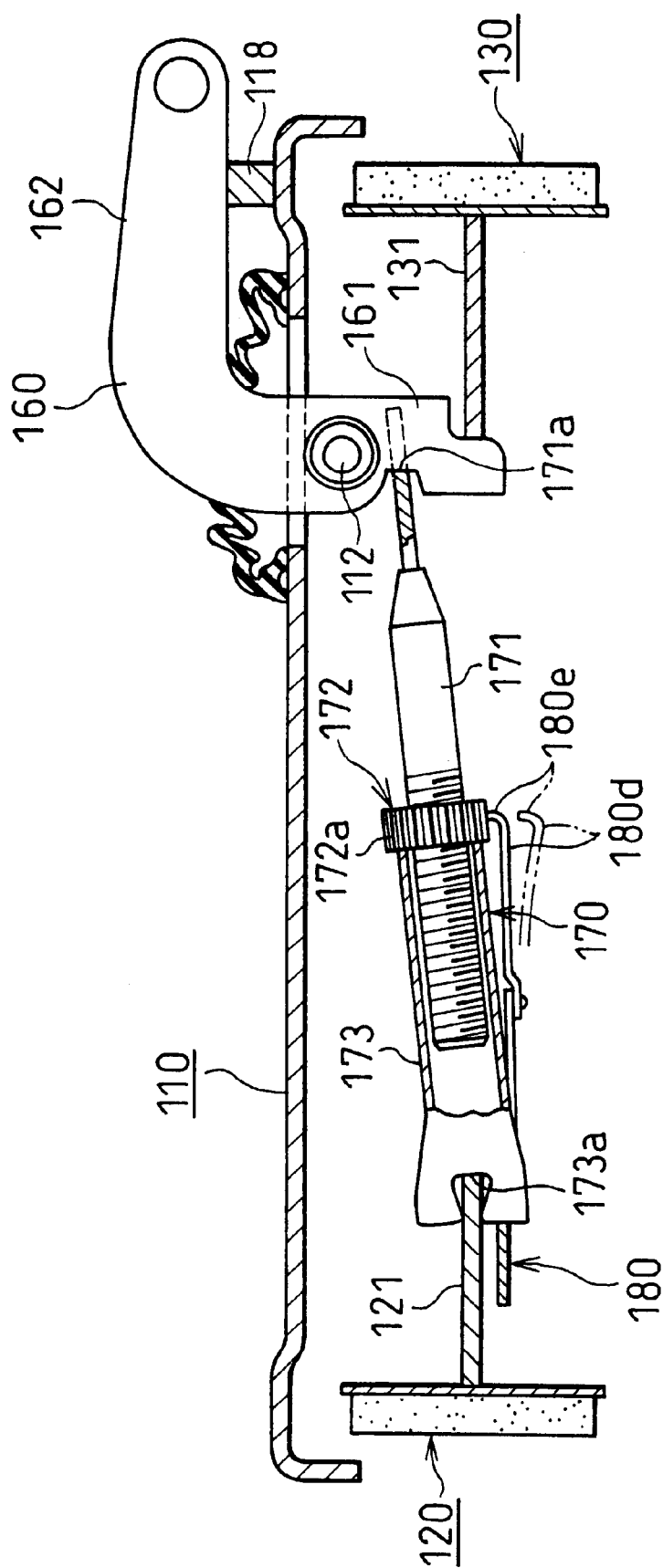
FIG. 5 is a cross-section view of FIG. 4 taken along the line V—V.

As shown in FIG. 5, a cross-pull type brake lever 160 is almost L-shaped and an inner lever portion 161 at one end of the brake lever 160 fits with [the] a notched groove 171a of the bolt 171 constituting a strut 170. The end of the inner lever portion 161 abuts inner side of the other brake shoe 130.

An intermediate portion of outer lever portion 162 of the brake lever 160 projecting outside a back plate 110 is abutted by a block 118 fixed on the back plate 110 restricting its return position. Also in this embodiment, a parking brake has no effect on the automatic shoe clearance adjustment operation, thus, an explanation of the known structure and the function will be omitted here.

In this embodiment, a means to prevent over-adjustment operation of shoe-to-drum clearances under excessive application force has the following configuration.

As shown in FIG. 6, a shaft 153a of a stepped head 153 interfits into a pocket of a piston 151 corresponding one brake shoe 120, and a notched groove 153b formed on the stepped head 153 interfits with the shoe web 121 restricting the relative rotation therebetween. A wheel 152 placed between the stepped surface of the stepped head 153 and the left end surface of the piston 151 is relatively rotatable to and fits with the shaft 153a.

An engagement pawl portion 180g of the third leg 180f formed on the adjustment lever 180 engages with the peripheral teeth 152a of the wheel 152 due to the biasing force of the shoe return spring 115, thereby enabling a rotation of the wheel 152 in one direction and restricting a free rotation thereof.

Regarding the automatic shoe clearance adjustment operation, almost same explanation as is described in the first embodiment is applicable. That is, as the linings 123, 133 wear out, if a wheel cylinder 150 is pressurized to separate brake shoes 120, 130 apart, the adjustment lever 180 rotates counterclockwise with the pin 114 due to the spring force of the shoe return spring 115 as shown in the FIG. 4. The first pawl portion 180e rotates the adjustment teeth 172a for one tooth pitch to extend the entire length of the strut 170 maintaining a constant shoe-to-drum clearances. In addition, a means to prevent over-adjustment operation of the shoe-to-drum clearances under high temperature condition may be configured with the bimetallic second leg 180d.

In the above-described automatic adjustment of a shoe-to-drum clearances, when the actuating force of the piston 151 reaches the predetermined magnitude, the wheel 152 is unrotatably caught between the stepped head 153 and the piston 151. As a result, a rotation of the adjustment lever 180 is restricted to inhibit automatic shoe clearance adjustment operation, thereby not sensing any elastic deformation of the brake drum and the brake shoes 120, 130.

In addition, when the brake temperature rises up to the certain degree, the second leg 180d of the adjustment lever 180 thermally deforms in the direction apart and away from the adjustment teeth 172a as shown a two-dot chain line in FIG. 5. Therefore, the ratchet engagement between the first pawl portion 180e and the adjustment teeth 172a is released. In regards to the operation of preventing the over-adjustment disabling the automatic shoe clearance adjustment device, the same description as in the first embodiment may be applicable.

As examples of means to prevent over-adjustment operation of shoe-to-drum clearances under high temperature condition described in the first embodiment or the second embodiment, configurations having a bimetallic part in the intermediate portion of the strut just as described in the U.S. Pat. No. 4,390,086 and Japanese Patent Application Unexamined Publication Number 11-2269 can be applicable as a third embodiment.

They comprise a strut having a nut and a socket and a folded bimetallic plate between the two, wherein when the brake temperature increases and reaches the certain degree, the bimetallic plate is thermally deformed to be opened despite the urging force of the adjustment spring acting on the strut, thereby extending the entire length of the strut to restrict the rotation of the adjustment lever and avoiding the over-adjustment operation of the shoe-to-drum clearances.

Figure 7:
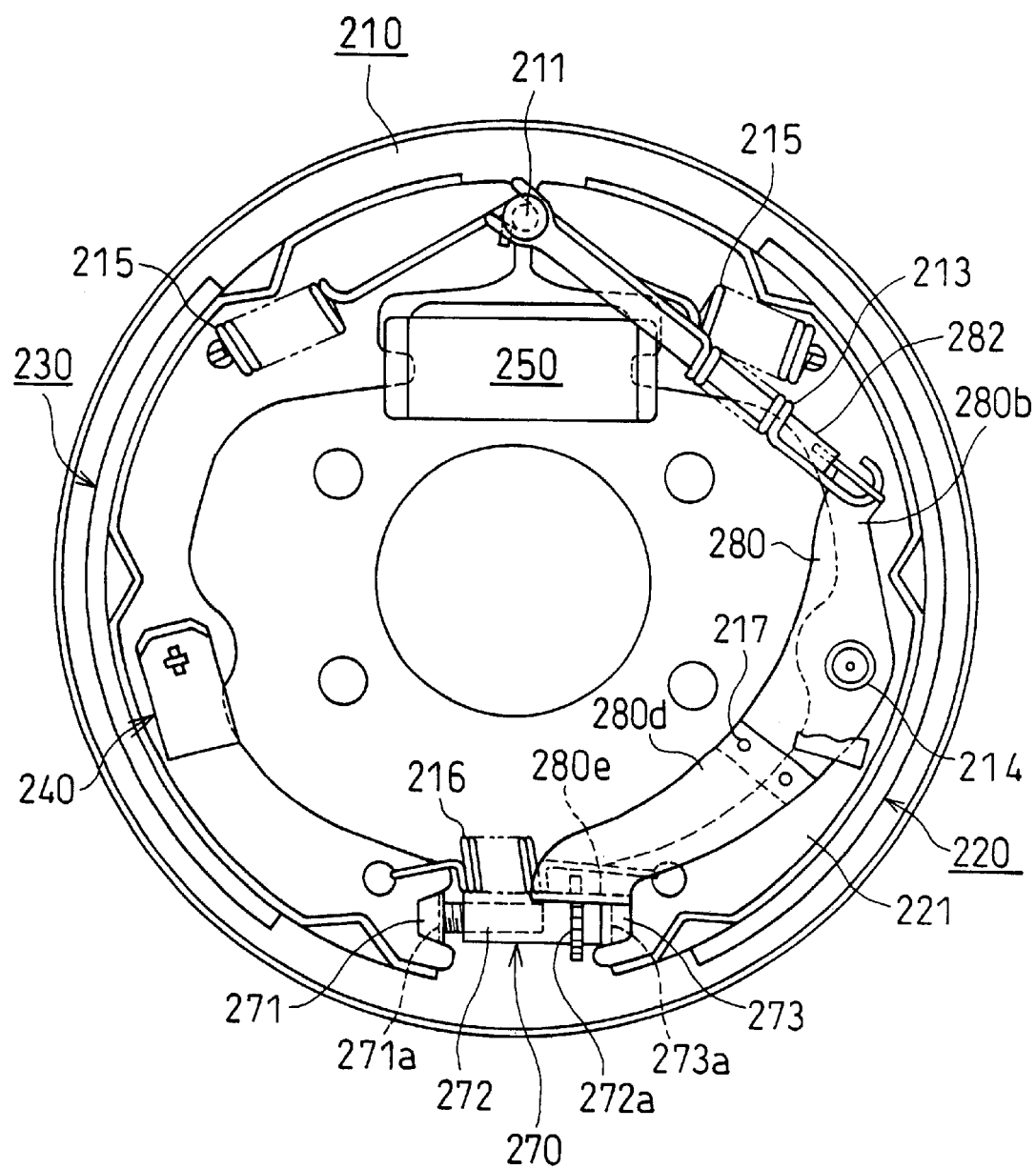
FIG. 7 is a plan view of the Duo Servo type drum brake equipped with the means to prevent over-adjustment operation of shoe-to-drum clearances relating to a fourth embodiment.

FIG. 7 shows another example of a duo-servo (DS) type drum brake device with an automatic shoe clearance adjustment device employing a means to prevent over-adjustment operation of shoe-to-drum clearances.

Reference number of the components of this embodiment are identified with a 200-series of numbers, and the components which are the same function as in the previous embodiments are identified with first and second position of reference number to be same as the embodiments, e. g. reference number "10", "110" and "210" are the same function. In such an instance, a detailed explanation is omitted hereafter.

In FIG. 7, the reference number 210 is a back plate; 220 and 230 are a pair of brake shoes; 250 is a wheel cylinder adjacent to an anchor pin 211 supporting upper adjacent ends of the brake shoes 220, 230; and 215 and 215 are shoe return springs extended between the anchor pin 211 and pair of brake shoes 220, 230.

A strut 270 employs an extendible screw mechanism placed between lower adjacent ends of the brake shoes 220 and 230, which comprises a nut 272 with adjustment teeth 272a, a bolt 271 screwed in the left side of the nut 272, and the head 273 rotatably fit into the right side of the nut 272, wherein the adjustment teeth 272a integrally formed on the nut 272 are rotated to screw the bolt 271 out to extend the entire length of the strut 270.

The bolt 271 and the head 273 have notched grooves to restore the lower adjacent ends of the brake shoes 230, 220 respectively holding the bolt 271 and the head 273 in between by the urging force of the shoe return spring 216.

The reference number 280 is an adjustment lever, and its intermediate portion is pivotally supported on a shoe web 221 being relative rotation thereto by a publicly known pivoting device such as a pivot structure 214 in combination with a fitting hole and a protuberance formed by burring or a pivot structure using a pin. A pawl portion 280e at the lower end of the second leg 280d of the adjustment lever 280 makes a ratchet engagement with the adjustment teeth 272a of the nut 272.

A connecting rod 282 is swayably positioned between an upper end 280b as a first leg of the adjustment lever 280 and the anchor pin 211. An adjustment spring 213 is coiling over the connecting rod 282, and hooking portions at its both ends are hooked on the anchor pin 211 and the upper end 280b of the adjustment lever 280 to be extended there between in order to maintain the specified position of the adjustment lever 280 and the connecting rod 282.

As a means to prevent over-adjustment operation under high temperature condition in this embodiment, the lower half side from the pivot section 214 of the adjustment lever 280, i.e., the second leg 280d is configured to be a bimetallic portion.

While applying the service brake, if a brake drum not shown in the figure rotates clockwise, the pivot section 214 of the adjustment lever 280 moves clockwise together with the brake shoe 220, and the upper end of the adjustment lever 280 is urged to abut the connecting rod 282 by the spring force of the adjustment spring 213, thereby rotating the adjustment lever 280 counterclockwise.

If the amount of rotation relating to the pawl portion 280e becomes more than one tooth pitch of the adjustment teeth 272a on the nut 272, the nut 272 with the adjustment teeth 272a is rotated to screw the bolt 271 out to extend the entire length of the strut 270.

During the automatic shoe clearance adjustment operation, because a braking force on one brake shoe 220 is transmitted to the other brake shoe 230 via the strut 270, an axial thrust of the strut 270 increases, which causes the increase of the rotation torque on fitted portion of threads of the nut 272 quickly. This results in disabling the rotation of the nut 272 and only extending the adjustment spring 213, thereby preventing over-adjustment operation inhibiting the automatic shoe clearance adjustment operation.

In addition, while in automatic shoe clearance adjustment, the brake temperature increases and reaches the certain degree, the bimetallic second leg 280d of the adjustment lever 280 is thermally deformed in the direction away from the adjustment teeth 272a, thereby releasing the ratchet engagement between the pawl portion 280e and the adjustment teeth 272a. As a result, the automatic shoe clearance adjustment function is disabled to prevent its over-adjustment operation.

Figure 8:
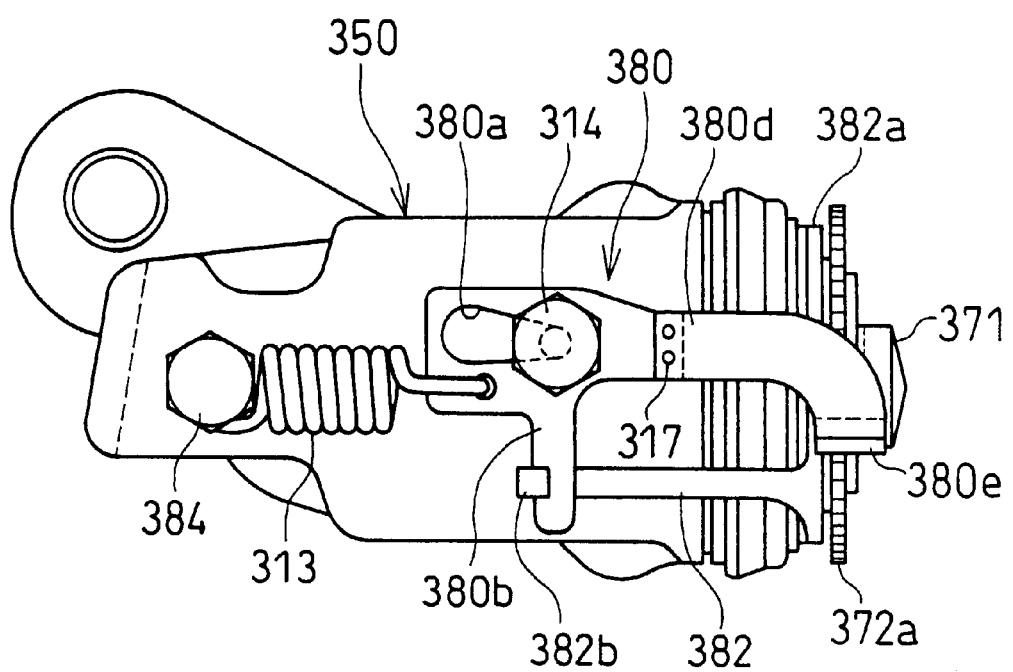
FIG. 8 is a plan view of a wheel cylinder equipped with the means to prevent over-adjustment operation of shoe-to-drum clearances relating to a fifth embodiment.
Figure 9:
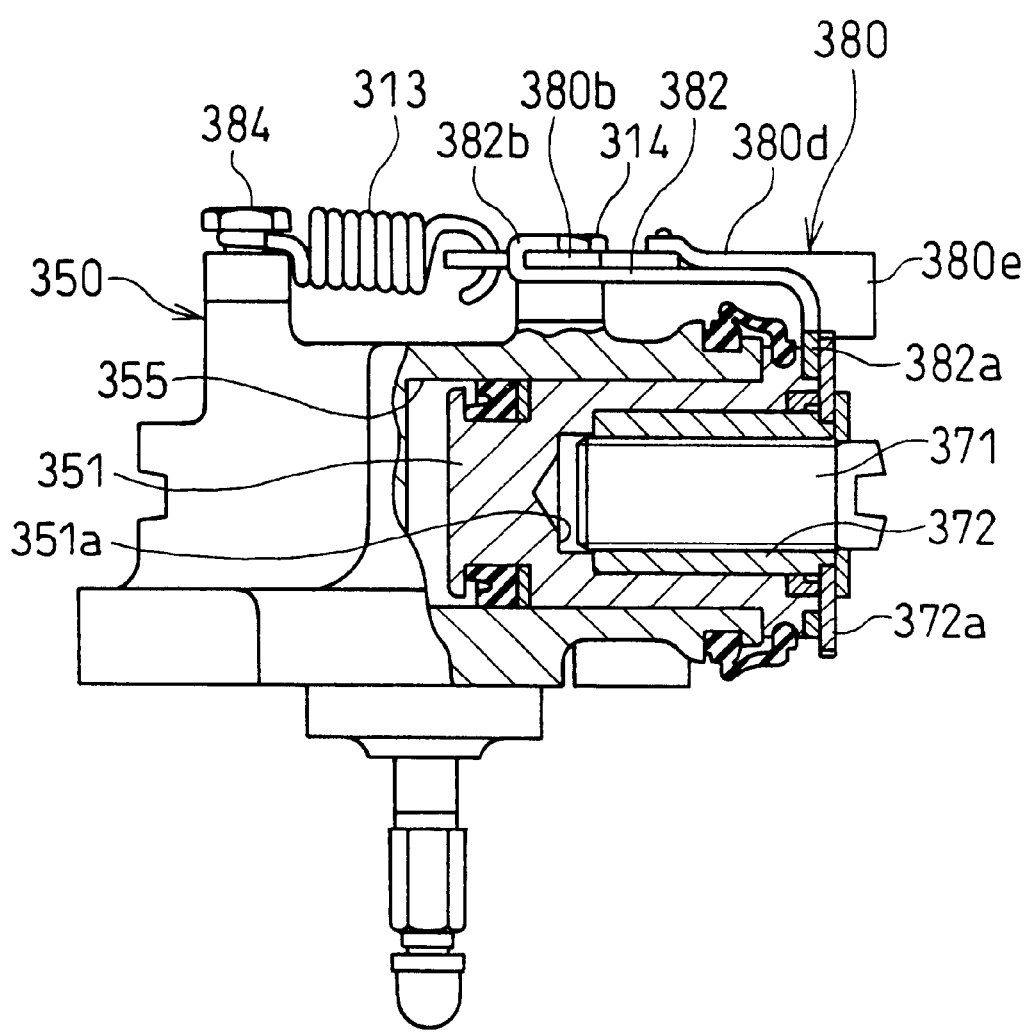
FIG. 9 is a front view with the partial broken-out section of the wheel cylinder shown in FIG. 8.

FIGS. 8 and 9 show another embodiment of the invention employing a means to prevent over-adjustment operation of shoe-to-drum clearances applied in a two leading (2L) type drum brake device for example as in Japanese Patent Application Unexamined Publication Number 7-4454 which comprises a wheel cylinder with an automatic shoe clearance adjustment device.

Reference numbers of the components of this embodiment are identified with a 300-series of numbers, and the components which are the same function as in the previous embodiments are identified with first and second position of reference number to be same as embodiments, e. g. reference number "10", "110", "210" and "310" are the same function. In this instance, a detailed explanation is omitted hereafter.

FIG. 8 is a plan view of the wheel cylinder 350 while FIG. 9 is a front view with the partial broken-out section of FIG. 8. A piston 351 is slidably inserted in a cylinder bore 355, and a nut 372 integrally fixed with an adjustment teeth 372a is rotatably fit into a blind hole 351a of the piston 351. A bolt 371 is screwed into the nut 372, and a notched groove of the bolt 371 is unrotatably fit with a shoe web, not shown in FIG. 8 or 9.

The adjustment lever 380 comprises a first leg 380b and a second leg 380d and is in almost L-shaped, wherein an oblong hole 380a positioned in its intermediate portion is supported by a pin 314 raised on a cylinder body.

A pawl portion 380e formed at the end of the second leg 380d of the adjustment lever 380 is ratchetly engaged with the adjustment teeth 372a.

As a means to prevent over-adjustment operation under high temperature condition, this embodiment employs a bimetallic material in the second leg 380d of the adjustment lever 380.

A connecting rod 382 has a ring portion 382a at one end, which is fixed on the front end surface of the piston 351, and a hooking portion 382b at the other end, which engages with the first leg 380b of the adjustment lever 380, where a stroking movement of the piston 351 is converted into the rotational movement of the adjustment lever 380.

An adjustment spring 313 is extended between a hooking bolt 384 raised on the cylinder body of the wheel cylinder 350 and the adjustment lever 380, and urges the adjustment lever 380 counterclockwise in FIG. 8 with an engagement section between the adjustment lever 380 and the connecting rod 382 as the fulcrum. The spring 313 also biases the pawl portion 380e of the second leg 380d to make a ratchet engagement with the adjustment teeth 372a.

When in service brake operation, the connecting rod 382 advances together as the piston 351 advances from the cylinder bore 355; the hooking portion 382b of the connecting rod 382 pulls the first leg 380b of the adjustment lever 380; and the adjustment lever 380 rotates counterclockwise with the pin 314.

As the adjustment lever 380 rotates, if a lining, not shown in the figures, is worn out, the pawl portion 380e rotates the nut 372 with the adjustment teeth 372a to screw the bolt 371 out, thereby automatically adjusting to maintain a constant shoe clearance.

During automatic shoe clearance adjustment operation, an actuating force of the piston 351 reaches the predetermined magnitude, the axial thrust of the screw-thread portion between the bolt 371 and the nut 372 increases which causes the increase of the rotation torque of the nut 372 quickly. This results in disabling the rotation of the nut 372 and only extending the adjustment spring 313 by advancing the adjustment lever 380 simultaneously with the connecting rod 382. Restricting the rotation of the nut 372 disables automatic shoe clearance adjustment operation and prevents the over-adjustment.

During automatic shoe clearance adjustment operation, if the brake temperature increases and reaches the certain degree, the bimetallic second leg 380d of the adjustment lever 380 is thermally deformed in the direction apart from the adjustment teeth 372a, releasing the ratchet engagement between the pawl portion 380e and the adjustment teeth 372a. Automatic shoe clearance function is disabled to prevent over-adjustment operation of the shoe-to-drum clearances.

Figure 10:
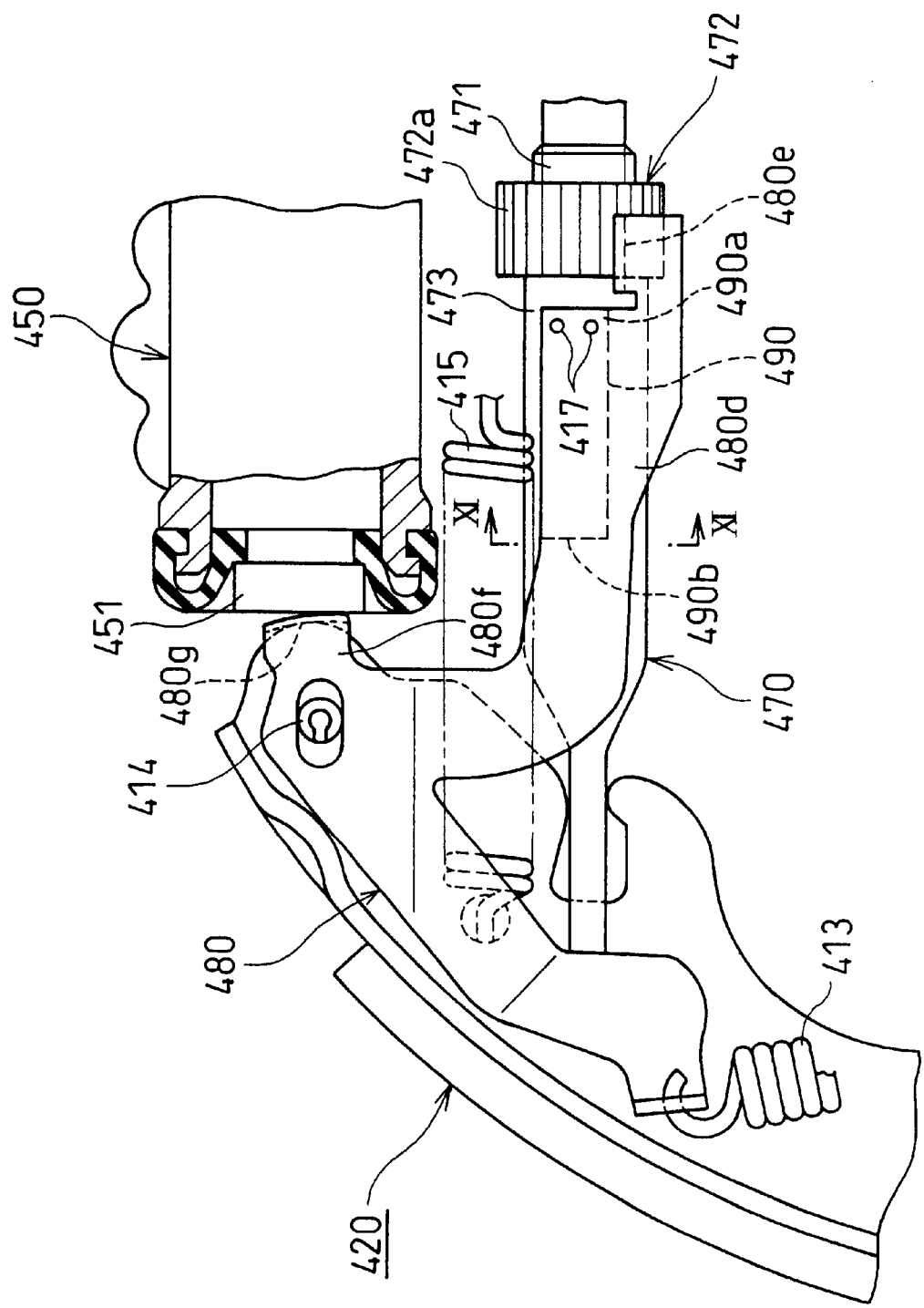
FIG. 10 is an explanation view of the means to prevent over-adjustment operation of shoe-to-drum clearances relating to a sixth embodiment.
Figure 11:
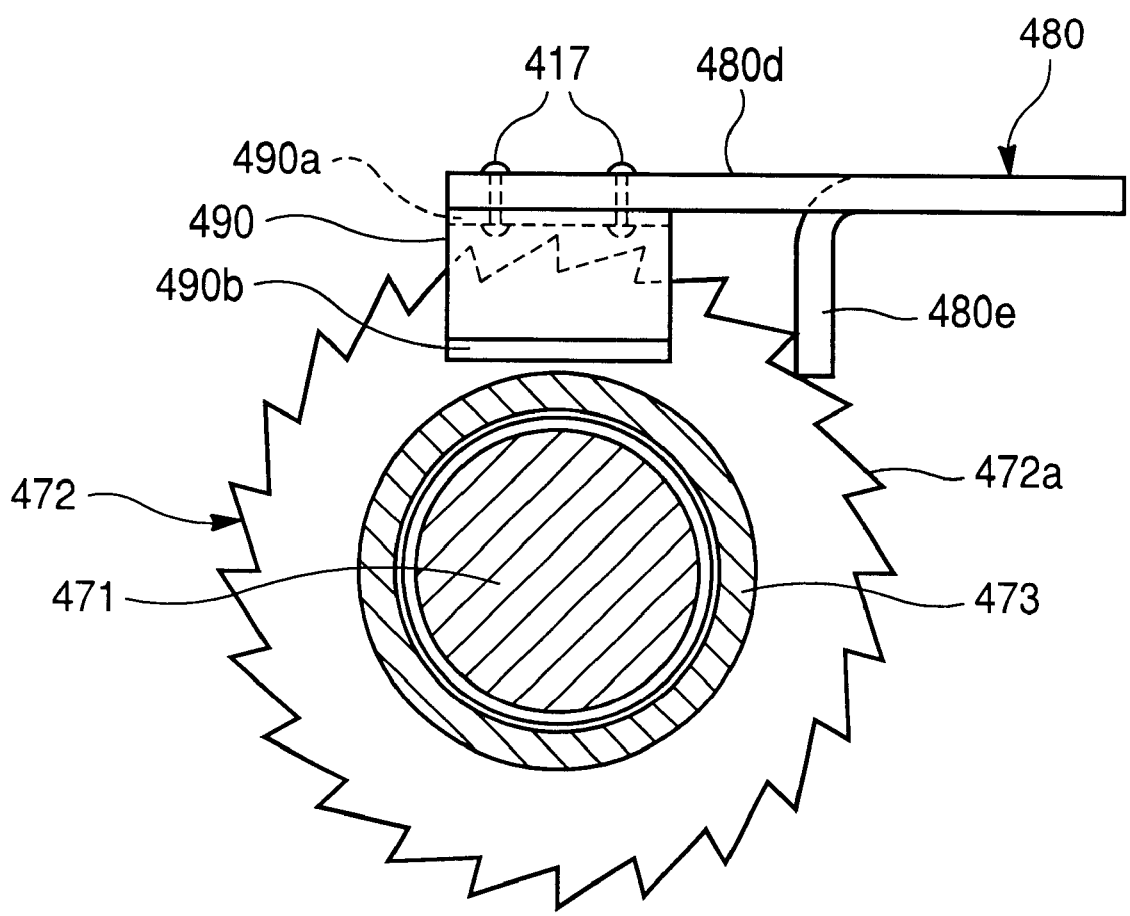
FIG. 11 is a cross-section view of FIG. 10 taken along the line XI—XI.
Figure 12:
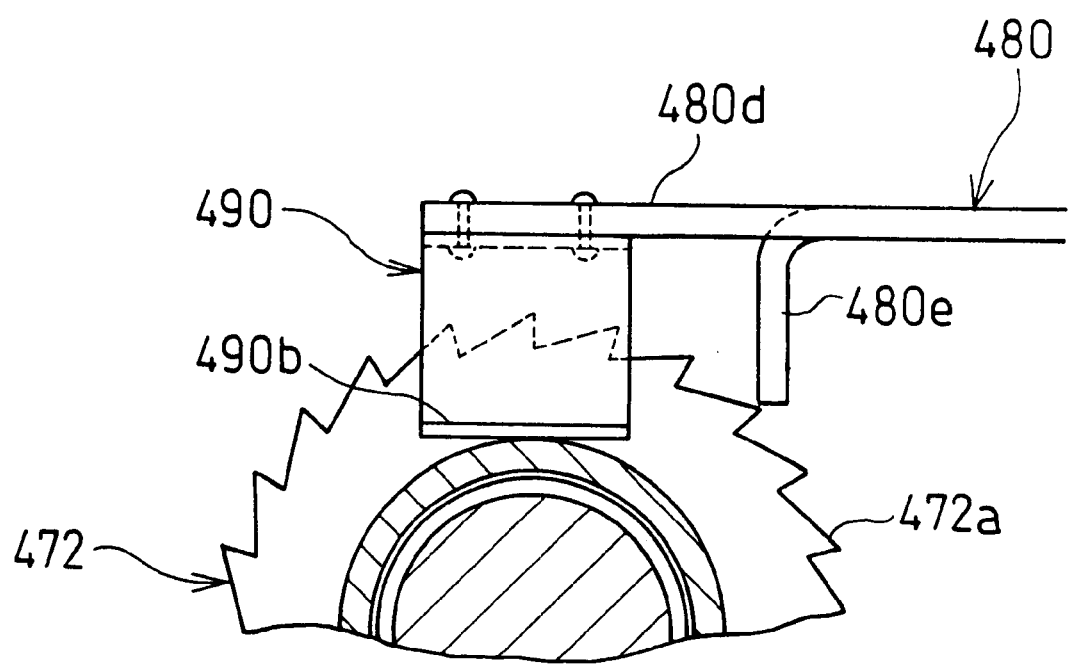
FIG. 12 is an explanation view when operating the means to prevent over-adjustment of shoe-to-drum clearances of FIG. 10 under high temperature.

FIGS. 10–12 shows another embodiment employing a bimetallic piece with over-adjustment prevention function integrally fixed to the adjustment lever as a means to prevent over-adjustment operation of shoe-to-drum clearances while under high pressure condition.

This embodiment provides means to prevent over-adjustment is applied in a LT type drum brake device as explained in the first embodiment of this invention.

Reference numbers of the components of this embodiment are identified with a 400-series of numbers, and the components which are the same function as in the previous embodiments are identified with first and second position of reference number to be same as embodiments, e. g. reference number "10", "110", "210", "310" and "410" are the same function. In such a case, a detailed explanation is omitted hereafter.

Operation in relation to automatic shoe clearance adjustment function and a means to prevent over-adjustment operation of shoe-to-drum clearances, which disables automatic shoe clearance adjustment when actuating force of or pressure on the brake shoe to move reaches the predetermined magnitude, is the same and the explanation is omitted here since the description in the first embodiment is applicable.

In this embodiment, a means to prevent over-adjustment operation of shoe clearances under high temperature condition is configured such that a bimetallic piece 490 is placed on a second leg 480d of an adjustment lever 480, wherein a fixed end portion 490a is integrally fixed with the second leg 480d such as by rivet and a free end portion 490b is bent toward a socket 473 to allow a small gap.

The bimetallic piece 490 functions as a thermal responsive member and maintains the gap between the free end portion 490b and the socket 473 as shown in FIG. 11, until the brake temperature rises up to the certain degree.

If the bimetallic piece 490 senses the certain degree of temperature, the free end portion 490b becomes thermally deformed in the direction to abut the socket 473. The bimetallic piece 490 continues to be thermally deformed even after being abutted against the outer circumference of the socket 473, where its reaction force is transmitted to the second leg 480d of the adjustment lever 480.

This reaction force works as an urging force operating on the pawl portion 480e together with the second leg 480d to urge them in the direction apart or away from the socket 473. As a result, as shown in FIG. 12, the ratchet engagement between the pawl portion 480e and the adjustment teeth 472a is released to disable the automatic shoe clearance adjustment for the prevention of the over-adjustment. The bimetallic piece 490 may abut the nut 472 instead of the socket 473.

Figure 13:
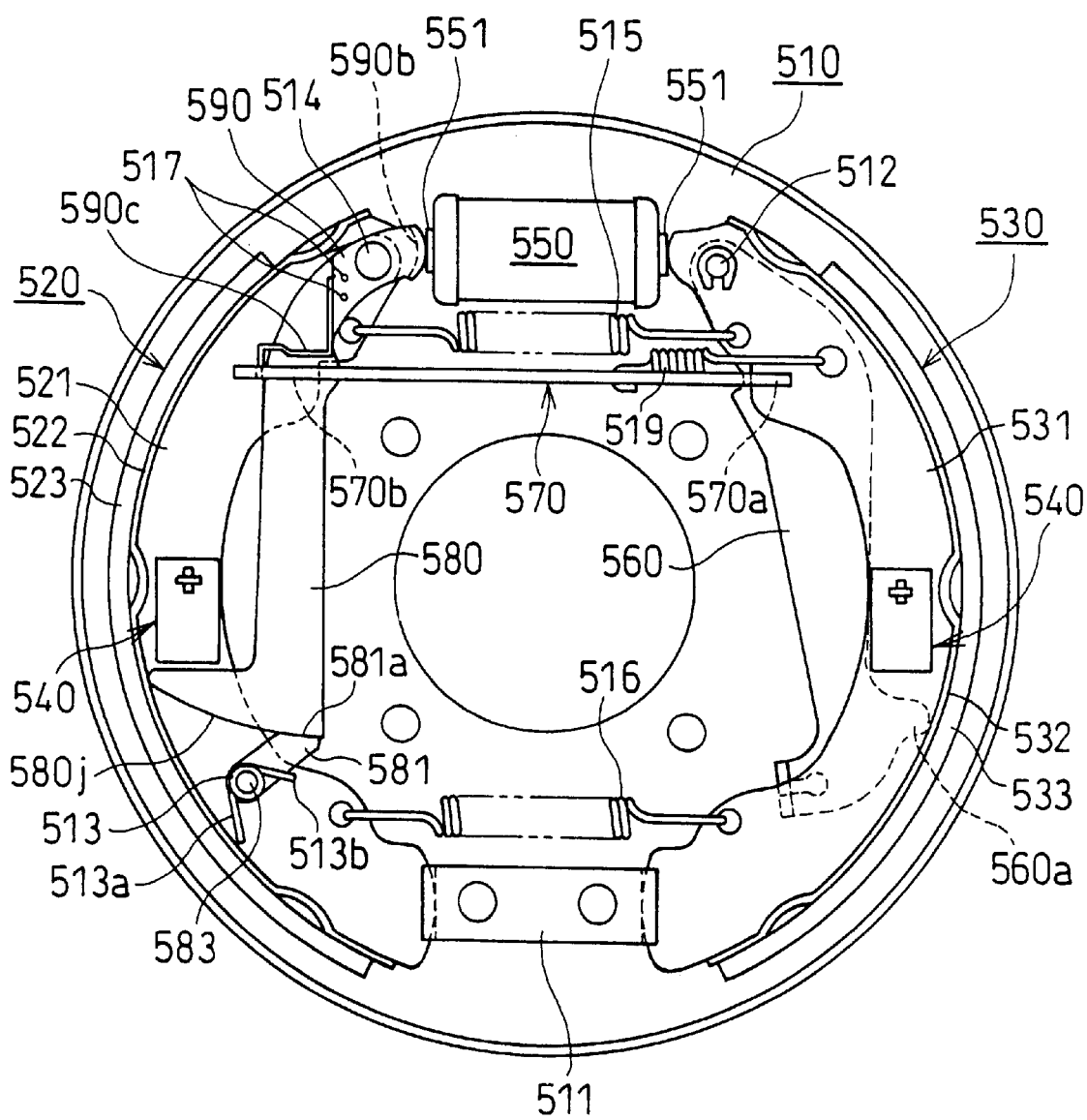
FIG. 13 is a plan view of the drum brake device equipped with the means to prevent over-adjustment operation of shoe-to-drum clearances relating to a seventh embodiment.
Figure 14:
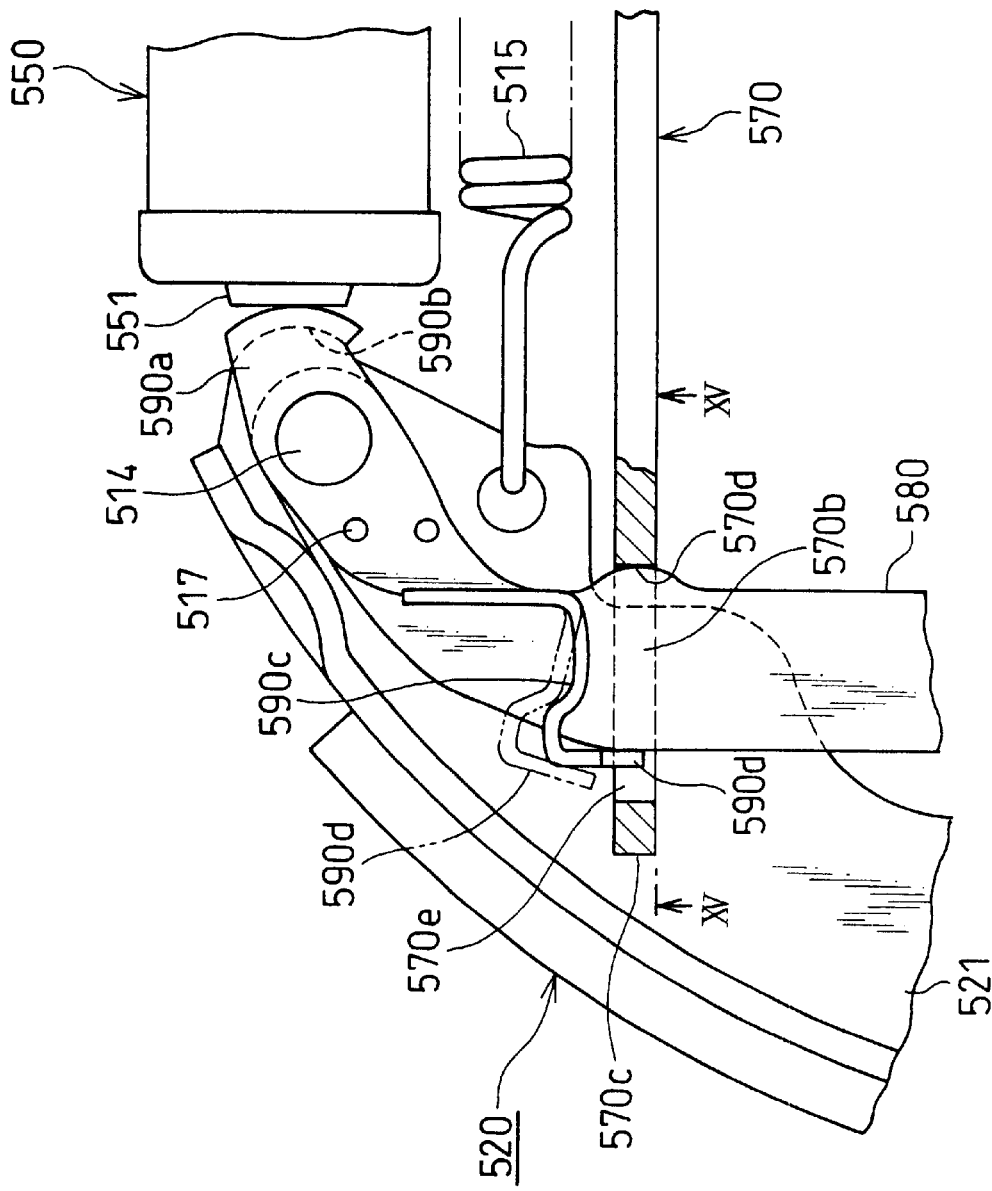
FIG. 14 is an enlarged view of the means to prevent over-adjustment operation of shoe-to-drum clearances shown in FIG. 13.
Figure 15:
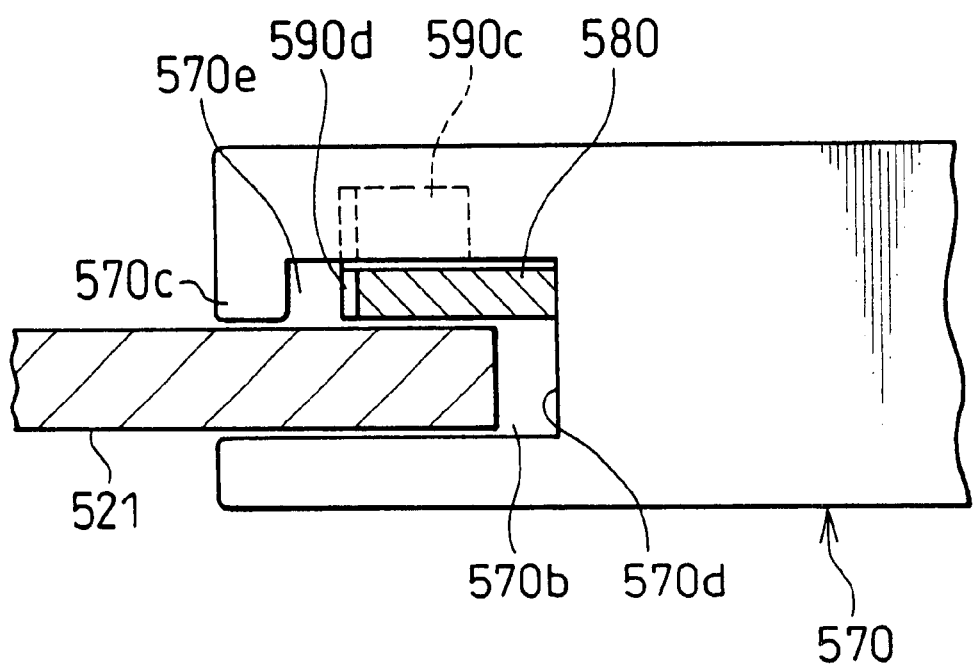
FIG. 15 is a cross-section view of FIG. 14 taken along the line XV—XV

FIGS. 13–15 show another (seventh) embodiment of the invention employing a means to prevent over-adjustment operation of shoe clearances while under high temperature condition comprising an independent bimetallic piece applied in a drum brake device with one-shot type automatic shoe clearance adjustment mechanism for example as disclosed in the Japanese Patent Application Unexamined Publication Number 2-15737.

Reference numbers of the components of this embodiment are identified with a 500-series of numbers, and the components which are the same function as in the previous embodiments are identified with first and second position of reference number to be same as embodiments, e. g. reference number "10", "110", "210", "310", "410" and "510" are the same function. In such a case, a detailed explanation is omitted hereafter.

An adjustment lever 580 is superposed on a shoe web 521 of a brake shoe 520 in FIG. 13, and is pivotally supported by a pin 514 provided adjacent to the upper end of the shoe web 521 and is relatively rotatable to the shoe web 521.

A forward-pull type brake lever 560 is superposed on a shoe web 531 of a brake shoe 530 and is pivotally supported by a pin 512 provided adjacent to the upper end of the shoe web 531 and is relatively rotatable to the shoe web 531. The brake lever 560 is designed such that a stopper 560*a* formed on an outer edge thereof restricts a return position of the brake lever 560 by abutting against the inner surface of a shoe rim 532 of the brake shoe 530.

A plate strut 570 has a notched groove 570*a* formed at its right side into which the intermediate portion of the brake lever 560 and the shoe web 531 fit while an inner edge of the brake lever 560 abuts against the bottom of the notched groove 570*a*. The strut 570 is designed to move together with the brake shoe 530 by the spring force of a spring 519 extended between the strut 570 and the shoe web 531 when a wheel cylinder 550 is pressurized.

Intermediate portions of the shoe web 521 and the adjustment lever 580 fit into a notched groove 570*b* formed on the left side of the strut 570. More specifically referring to FIG. 15, the adjustment lever 580 is retained in a space 570*e* specified by a projection 570*c* formed at the end of the notched groove 570*b* and a bottom 570*d* of the notched groove 570*b*, and an inner edge of the adjustment lever 580 abuts the bottom 570*d* of a notched groove 570*b* while there is a gap between its outer edge and the projection 570*c*. The shoe web 521 fit in the notched groove 570*b* forms a space between its inner edge and the bottom 570*d*.

As shown in FIG. 13, a lower edge portion of the adjustment lever 580 is in an arc-shape and has small teeth 580*j* on its outer circumference. One side of a toothed bridge 581 is pivotally supported at the lower portion of the shoe web 521 by a pin 583 and is relatively rotatable to the shoe web 521 while the other side with small teeth 581*a* formed on the peripheral end surface engages with the small teeth 580*j* of the adjustment lever 580.

An adjustment spring 513 in a kind of a torsion spring has a coiled portion placed over the pin 583, where one wire end 513*a* abuts an inner surface of a shoe rim 522 of the brake shoe 520 and the other wire end 513*b* is hooked on the toothed bridge 581, urging the toothed bridge 581 counterclockwise toward the adjustment lever 580 in maintaining the engagement between the small teeth 580*j* and 581*a* respectively.

As shown in an enlarged view of FIG. 14, a bimetallic piece 590 is fixed around the pivot section of the adjustment lever 580 with the pin 514 by such as rivet, or other suitable fastener as known by those of skill in the art.

The bimetallic piece 590 has an intercalated portion 590*b* at the end of an extended portion 590*a* facing a piston 551, which is formed by bending an end of bimetallic piece 590 in the right angle. The intercalated portion 590*b* is caught between the piston 551 and an end of shoe web 521 and has the force sensing section responsive to brake shoe operation to disable automatic shoe clearance adjustment function when actuating force to spread the pair of brake shoes 520, 530 apart reaches the predetermined magnitude.

The force sensing section may be formed on the adjustment lever 580 instead of the intercalated portion 590*b* of the bimetallic piece 590.

A free end 590*c* of the bimetallic piece 590 extending from a point fixed with the adjustment lever 580 is raised in the intermediate portion in the right angle to form a crank-shape, and a top end 590*d* abuts against the outer edge of the adjustment lever 580 in a space 570*e* formed in the strut 570, thereby constituting a thermal responsive section.

A gap for setting the shoe clearance is reserved between the top end 590*d* and the projection 570*c* of the strut 570. The top end 590*d* as a thermal responsive section is designed to be thermally deformed in the direction out from the gap when the brake temperature rises up to the certain [high] degree.

During the service brake operation, the pair of brake shoes 520, 530 separates at the point of abutment with the anchor 511 as the fulcrum until they abut against the brake drum not shown in FIG. 13. The strut 570 and the brake lever 560 follow the brake shoe 530 due to the spring force of the spring 519. The adjustment lever 580, the toothed bridge 581 and so on move substantially integral with the brake shoe 520.

If the amount of separation of the brake shoes 520, 530 become larger than the predetermined value due to the linings 523, 533 wear, an inner edge of the projection 570*c* of the strut 570 abuts the top end 590*d* of the bimetallic piece 590 inserted in the space 570*e* and results in taking up the clearance, and further the adjustment lever 580 rotates counterclockwise in FIG. 13 or 14 against the torsion force of the adjustment spring 513, thereby altering the relative engagement position between the small teeth 581*j* of the adjustment lever 580 and the small teeth 581*a* of the toothed bridge 581. Accordingly, the length of the strut 570 is substantially extended to maintain almost constant shoe-to-drum clearances.

When in the automatic shoe clearance adjustment, if the actuating force to the brake shoe 520 reaches the predetermined magnitude, the intercalated portion 590*b* of the bimetallic piece 590 integrally formed with the adjustment lever 580 is caught between the piston 551 and the shoe web 521, which gives a forcible restriction on the rotation of the adjustment lever 580.

After disabling the rotation of the adjustment lever 580, due to extension of the spring 519, the brake shoe 520 moves substantially integral with the strut 570, the adjustment lever 580, the toothed bridge 581 and so on; therefore, the shoe clearance adjustment function is disabled to prevent the over-adjustment operation.

If the brake temperature rises up to the certain degree, the free end 590*c* of the bimetallic piece 590 starts to be thermally deformed. As shown a two-dot chain line in FIG. 14, the end 590*d* as a thermo-responsive section moves out from the space 570*e* of the notched groove 570*b* and results in elongation of the space 570*e* for the thickness of the top end 590*d*, thereby substantially disabling the shoe clearance adjustment function to prevent over-adjustment operation.

The respective above-described embodiment details the case when a bimetallic thermal sensing section is integrally formed on an adjustment lever or when an independent bimetallic piece is integrally fixed on an adjustment lever both functioning as a means to prevent over-adjustment operation of shoe-to-drum clearances while under high temperature condition. Instead of employing such bimetallic member on the adjustment lever, an adjustment spring, which is a member constituting an automatic shoe clearance adjustment device and is explained in the respective previous embodiment, may be made of a bimetallic material having weakened spring force characteristic responsive to high temperature.

Because of the above-described structure, this invention has the following advantages.

Even if the particular brake controlled by the EBD (Electronic Brakeforce Distribution) system is frequently actuated under high load or high temperature condition, this invention avoids the necessity of setting a larger shoe-to-drum clearances than that in the normal use by disabling the automatic shoe clearance adjustment function when the actuating force to the brake shoes reaches the predetermined magnitude or the brake temperature rises up to the certain degree. This prevents the over-adjustment operation of shoe-to-drum clearances and maintains a comfortable braking action.

This invention permits a smaller drum brake design without sacrificing shoe clearance over-adjustment operation. Therefore, it provides a better environmental and energy conservation resolution.

Further, this invention is applicable and gives an easy applicability to all variety of brakes.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A drum brake device with an automatic shoe clearance adjustment device,
   said automatic shoe clearance adjustment device extended between a pair of adjacent ends of facing brake shoes comprising a restricting means for restricting return positions of said brake shoes and for displacing automatically said brake shoes in a separation direction to separate each brake shoe when a shoe-to-drum clearances exceed predetermined value, wherein;
   said automatic shoe clearance adjustment device further has a preventing means to prevent an over-adjustment of said shoe-to-drum clearances by inhibiting said displacement of the brake shoes in the separation direction to separate each brake shoe due to said restricting means when at least one of an actuating force to separate said pair, of brake shoes reaches the predetermined magnitude and a temperature in the drum brake rises up to the certain degree.

2. A drum brake device with an automatic shoe clearance adjustment device as claimed in claim 1, wherein
   said restricting means comprises a screw mechanism and adjustment teeth, and
   when an amount of rotational movement of an adjustment lever which automatically senses an excessive brake shoes separation exceeds one tooth pitch of said adjustment teeth, said adjustment lever urges said adjustment teeth into rotation resulting in length extension of said screw mechanism and displacement of said brake shoes in the separation direction to separate each brake shoe.

3. A drum brake device with an automatic shoe clearance adjustment device as claimed in claim 2, wherein
   said adjustment lever is pivotally supported on one brake shoe for the rotation relative to said one brake shoe,
   said adjustment lever has two legs, and
   due to an urging force of an adjustment spring, a first leg extending from a pivot section of said adjustment lever is urged to be elastically engaged with one end of said restricting means while a second leg also but oppositely extending from said pivot section of said adjustment lever is urged to be ratchet-engaged with said adjustment teeth.

4. A drum brake device with an automatic shoe clearance adjustment device as claimed in claim 2, wherein
   said adjustment lever is pivotally supported on one brake shoe for the rotation relative to said one brake shoe, and
   said adjustment lever has two legs, and due to urging force of an adjustment spring, a first leg extending from a pivot section of said adjustment lever is urged to be elastically engaged with one end of an engagement piece integrally acts with a piston, a device to displace said brake shoes, while a second leg also but oppositely extending from said pivot section of said adjustment lever is urged to be ratchet-engaged with said adjustment teeth.

5. A drum brake device with an automatic shoe clearance adjustment device as claimed in claim 2, wherein
   said adjustment lever is integrally provided with a force sensing section responsive to a brake shoe movement and a bimetallic thermal sensing section responsive to a temperature within a drum brake, and
   said force sensing section and said bimetallic thermal sensing section function as a means to prevent over-adjustment operation of shoe-to-drum clearances.

6. A drum brake device with an automatic shoe clearance adjustment device as claimed in claim 3 wherein
   said force sensing section responsive to brake shoe action is extended from said pivot section of said adjustment lever and is positioned so as to be rotatable in the crossing direction of an axial line of a brake shoe actuating device,
   when a force acting on said force sensing section from said actuating device becomes stronger than a urging force of an adjustment spring acting thereon, said adjustment lever is restricted to rotate by sandwiching said force sensing section between said actuating device and said brake shoe.

7. A drum brake device with an automatic shoe clearance adjustment device as claimed in claim 4, wherein
   when an axial force acting on said screw mechanism of said restricting means becomes higher than an urging force of said adjustment spring acting on a pawl end of said adjustment lever, a rotation resistance of said screw mechanism increases to inhibit rotation of said adjustment lever.

8. A drum brake device with an automatic shoe clearance adjustment device as claimed in claim 2, wherein
   a bimetallic piece is installed on the second leg of said adjustment lever, and
   when a brake temperature reaches a certain degree, said pawl end formed at the end of the second leg thermally deformed apart from said adjustment teeth to release said ratchet engagement between the second leg and said adjustment teeth.

9. A drum brake device with an automatic shoe clearance adjustment device as claimed in claim 1, wherein
   said restricting means comprises a teeth engagement mechanism allowing a rotation of said adjustment lever in one direction, and a strut, and
   as said strut which automatically senses excess brake shoe movement rotates said adjustment lever, a position of teeth engagement among the small teeth at said adjustment lever moves to rotate said brake shoe to spread apart.

10. A drum brake device with an automatic shoe clearance adjustment device as claimed in claim 9, wherein
    a force sensing section responsive to brake shoe action and a bimetallic thermal sensing section responsive to brake temperature are substantially integrated with said adjustment lever, and said force sensing section and said bimetallic thermal sensing section function as a means to prevent over-adjustment operation of shoe-to-drum clearances.

11. A drum brake device with an automatic shoe clearance adjustment device as claimed in claim 10, wherein a force sensing section responsive to brake shoe action is extended from said pivot section of adjustment lever and is positioned so as to be rotatable in the crossing direction of an axial line of a brake shoe actuating device, when a force acting on said force sensing section from said actuating device becomes stronger than a urging force of said adjustment spring acting thereon, said adjustment lever is restricted to rotate by sandwiching said force sensing section between said actuating device and said brake shoes.

12. A drum brake device with an automatic shoe clearance adjustment device as claimed in claim 10, wherein said adjustment lever and a top end of said bimetallic piece abutting against the back of said adjustment lever are inserted inbetween a space at one side of the strut, forming a space at the side toward which said brake shoes spread open when a brake temperature reaches a certain degree, said bimetallic piece thermally deform for the top end thereof coming out from said space in the direction to expand said space.

* * * * *